United States Patent
Li et al.

(10) Patent No.: US 11,494,262 B2
(45) Date of Patent: Nov. 8, 2022

(54) ELECTRONIC DEVICE HAVING ONE-TIME-PROGRAMMABLE (OTP) MEMORY AND METHOD FOR WRITING AND READING OTP MEMORY

(71) Applicant: REALTEK SEMICONDUCTOR CORP., Hsinchu (TW)

(72) Inventors: Ming-Rui Li, Hsinchu (TW); Liang-Liang Song, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/324,638

(22) Filed: May 19, 2021

(65) Prior Publication Data
US 2022/0276926 A1    Sep. 1, 2022

(30) Foreign Application Priority Data
Feb. 26, 2021 (CN) .......................... 202110219143.1

(51) Int. Cl.
*G11C 29/00* (2006.01)
*G06F 11/10* (2006.01)
*G06F 11/30* (2006.01)

(52) U.S. Cl.
CPC ...... *G06F 11/1068* (2013.01); *G06F 11/1004* (2013.01); *G06F 11/3037* (2013.01)

(58) Field of Classification Search
CPC ............. G06F 11/1068; G06F 11/3037; G06F 11/1004
See application file for complete search history.

(56) References Cited

U.S. PATENT DOCUMENTS

2011/0087898 A1* 4/2011 Williams .............. H04L 9/3236
380/46
2021/0042188 A1   2/2021 Chen et al.

\* cited by examiner

*Primary Examiner* — Samir W Rizk
(74) *Attorney, Agent, or Firm* — Birch, Stewart, Kolasch & Birch, LLP

(57) ABSTRACT

An electronic device having a one-time-programmable (OTP) memory and a method for writing and reading an OTP memory are provided. The electronic device is adapted to perform the method for writing and reading an OTP memory. The electronic device includes an OTP memory, an internal memory, and a processor. The processor is configured to write an original value into the OTP memory as a burnt code and read the burnt code from the OTP memory. When the burnt code is not identical to the original value, the processor obtains a checksum according to the original value, the burnt code, and a check operation process, and stores the checksum into the internal memory. Upon receipt of a reading request, the processor executes a recovery operation process according to the burnt code and the checksum to generate the original value.

10 Claims, 5 Drawing Sheets

ELECTRONIC DEVICE HAVING ONE-TIME-PROGRAMMABLE (OTP) MEMORY AND METHOD FOR WRITING AND READING OTP MEMORY

CROSS-REFERENCE TO RELATED APPLICATION

This non-provisional application claims priority under 35 U.S.C. § 119(a) to Patent Application No. 202110219143.1 filed in China, P.R.C. on Feb. 26, 2021, the entire contents of which are hereby incorporated by reference.

BACKGROUND

Technical Field

The present disclosure relates to an electronic device having a memory and an access method, and in particular, to an electronic device having a one-time-programmable (OTP) memory and a method for writing and reading an OTP memory.

Related Art

With demands for data protection of electronic devices, a large number of electronic manufacturers often adopt a one-time-programmable (OTP for short) memory as an apparatus for storing important data. A characteristic of the OTP memory is that data is written into a memory at a time, so that the data storage is irreversible. Therefore, in addition to storing an identification code of a chip (an integrated circuit), the OTP memory is also used for firmware upgrade version confirmation and for storage of information such as encrypted information, personal identification code, or device verification code, and the like.

A method for writing data to OTP memory includes blown fuse, ultraviolet radiation, electric actuation, or the like. In the process of writing a specific bit to the OTP memory, the adjacent two bits may be affected, causing the written value to change. The bit change may cause a problem that a burnt code stored in the OTP memory is not identical to the expected written value. The OTP memory that suffers a bit change is wasted due to the one-time writable characteristic of the OTP memory, thereby affecting a function corresponding to the information of the OTP. In addition, efficiency of sampling inspection of mass-produced OTP memories according to the prior art is low, and costs of comprehensive inspection are very high.

SUMMARY

In view of this, according to some embodiments, an electronic device having an OTP memory is adapted to perform a method for writing and reading. The method solves the waste the OTP memory due to bit change of a value during burning into the OTP memory.

In some embodiments, an electronic device having an OTP memory includes the OTP memory, an internal memory, and a processor. The processor is configured to write an original value into the OTP memory as a burnt code and read the burnt code from the OTP memory. When the burnt code is not identical to the original value, the processor obtains a checksum according to the original value and the burnt code, and stores the checksum into the internal memory. Since the burnt code is not directly related to the original value, the process of accessing the data can reduce a risk of data leakage.

In some embodiments, the processor executes a check operation process on the original value and the burnt code to obtain the checksum.

In some embodiments, the check operation process is selected from at least one of the group consisting of an exclusive-OR operation, an OR operation, an AND operation, an addition operation, and a subtraction operation. The mechanism of the check operation can achieve the advantages of simple implementation of fast operations and low hardware costs.

In some embodiments, an electronic device having an OTP memory includes an OTP memory, an internal memory, and a processor. The OTP memory is configured to store the burnt code. The internal memory is configured to store the checksum. The processor is configured to execute a recovery operation process according to the burnt code and the checksum to obtain the original value.

In some embodiments, the recovery operation process is selected from at least one of the group consisting of an exclusive-OR operation, an OR operation, an AND operation, an addition operation, and a subtraction operation.

In some embodiments, a method for writing an OTP memory includes the following steps: writing an original value into an OTP memory as a burnt code; reading the burnt code from the OTP memory; obtaining a checksum according to the original value and the burnt code when the original value is not identical to the burnt code; and storing the checksum.

In some embodiments, the step of obtaining a checksum further includes: performing a check operation on the original value and the burnt code to obtain the checksum.

In some embodiments, a method for reading an OTP memory includes the following steps: reading burnt code and a checksum; and executing a recovery operation process for the burnt code and the checksum to obtain the original value.

In some embodiments, before the step of reading burnt code and a checksum, the method includes: determining whether a checksum is found; if the checksum is not found, outputting the burnt code; and if the checksum is found, reading the burnt code and the checksum.

The electronic device having an OTP memory and the method for writing and reading can check the erroneous burnt code existing in the OTP memory, especially in a case that a bit change occurs when the original value is written into the OTP memory. When an external apparatus is to read the electronic device and the original value, the electronic device can obtain the correct original value through the check method. The processor can achieve the purpose of checking only through the bit operation during writing and reading of the original value. Compared with other check means, an arrangement of hardware or software for the bit operation is more economical and simpler.

DETAILED DESCRIPTION

Figure 1:
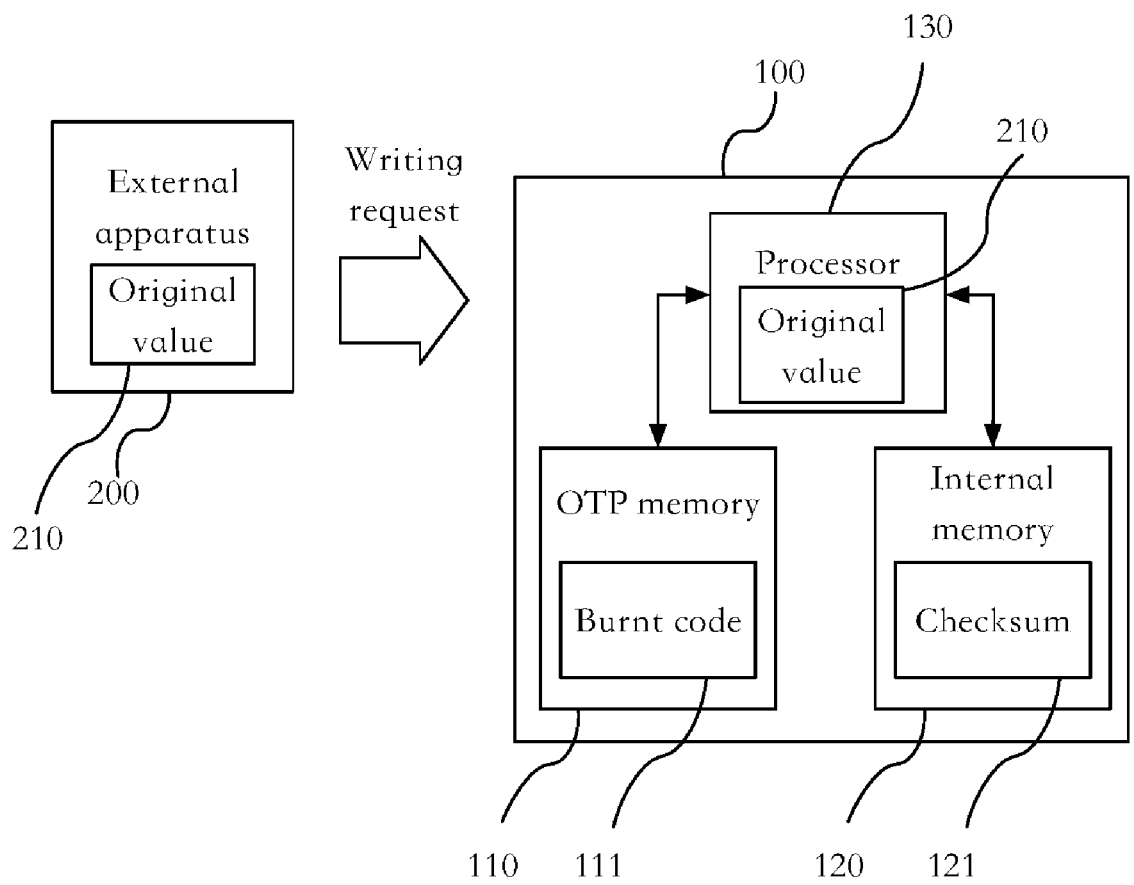
FIG. 1 is a schematic diagram of a system architecture according to an embodiment of the present disclosure.

FIG. 1 is a schematic diagram of a system architecture according to an embodiment of the present disclosure. In some embodiments, an electronic device 100 includes a one-time-programmable memory 110 (an OTP memory 110 for short below), an internal memory 120, and a processor 130. The electronic device 100 may be applied to a mobile communication device, a computer device, a multimedia device, or the like. The processor 130 is coupled to the OTP memory 110 and the internal memory 120. The OTP memory 110 stores a burnt code 111. The internal memory 120 stores a checksum 121. Types of the internal memory 120 are not limited to a non-volatile memory or a volatile memory. Generally, the checksum 121 is stored in the non-volatile memory to avoid data loss due to power failure.

The processor 130 is configured to receive an original value 210 from an external apparatus 200, or the processor 130 generates an original value 210 by itself. A generation source of the original value 210 is not limited in the present disclosure. The content of the original value 210 may be, but is not limited to, a chip identification code, firmware version information, encrypted information, personal identification number (PIN), or a device verification code. The processor 130 writes the original value 210 into the OTP memory 110.

For example, the electronic device 100 receives a writing request from the external apparatus 200, and the processor 130 writes the original value 210 into the OTP memory 110 according to the writing request. As for the external apparatus 200, the external apparatus 200 writes the original value 210 into the electronic device 100 and the OTP memory 110. As for the electronic device 100, the processor 130 burns the original value 210 into the OTP memory 110. However, the operations such as writing or burning are directed to an action that the original value 210 is stored into the OTP memory 110.

Figure 2A:
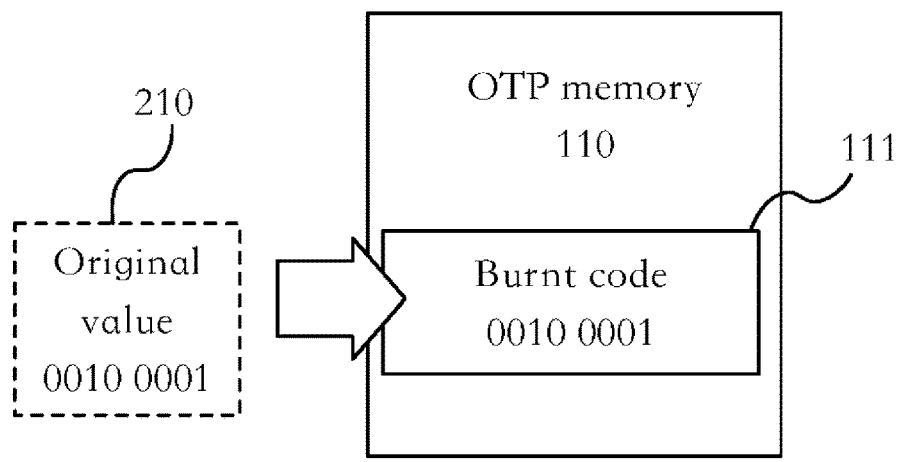
FIG. 2A is a schematic diagram of writing an original value and a correct burnt code according to the present disclosure.
Figure 2B:
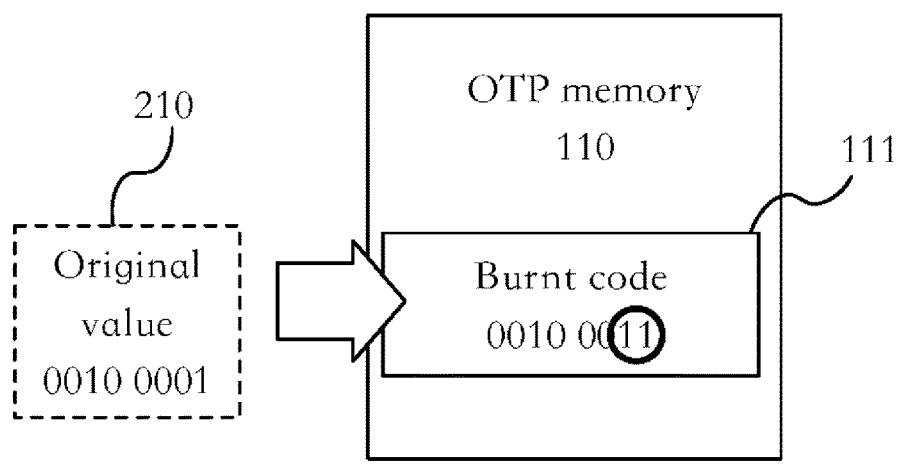
FIG. 2B is a schematic diagram of writing an original value and an erroneous burnt code according to the present disclosure.

Based on the above, since some of the values may change during burning of the original value 210 into the OTP memory 110, the value that is burnt into the OTP memory 110 is different from the expected original value 210, as shown in FIG. 2A and FIG. 2B. Therefore, the value that is actually burnt into the OTP memory 110 is represented as the burnt code 111. FIG. 2A shows a situation in which the burnt code 111 is identical to the original value 210, and FIG. 2B shows a situation in which the burnt code 111 is different from the original value 210. The difference is shown by a black circle with thick outline in FIG. 2B. Bit lengths of the original value 210 and the burnt code 111 are determined depending various application scenarios. The original value and the bit length of the burnt code in FIG. 2A and FIG. 2B are only examples and not limited thereto. However, the values shown in FIG. 2A and FIG. 2B are only examples, and the bit change is not limited thereto.

Figure 3A:
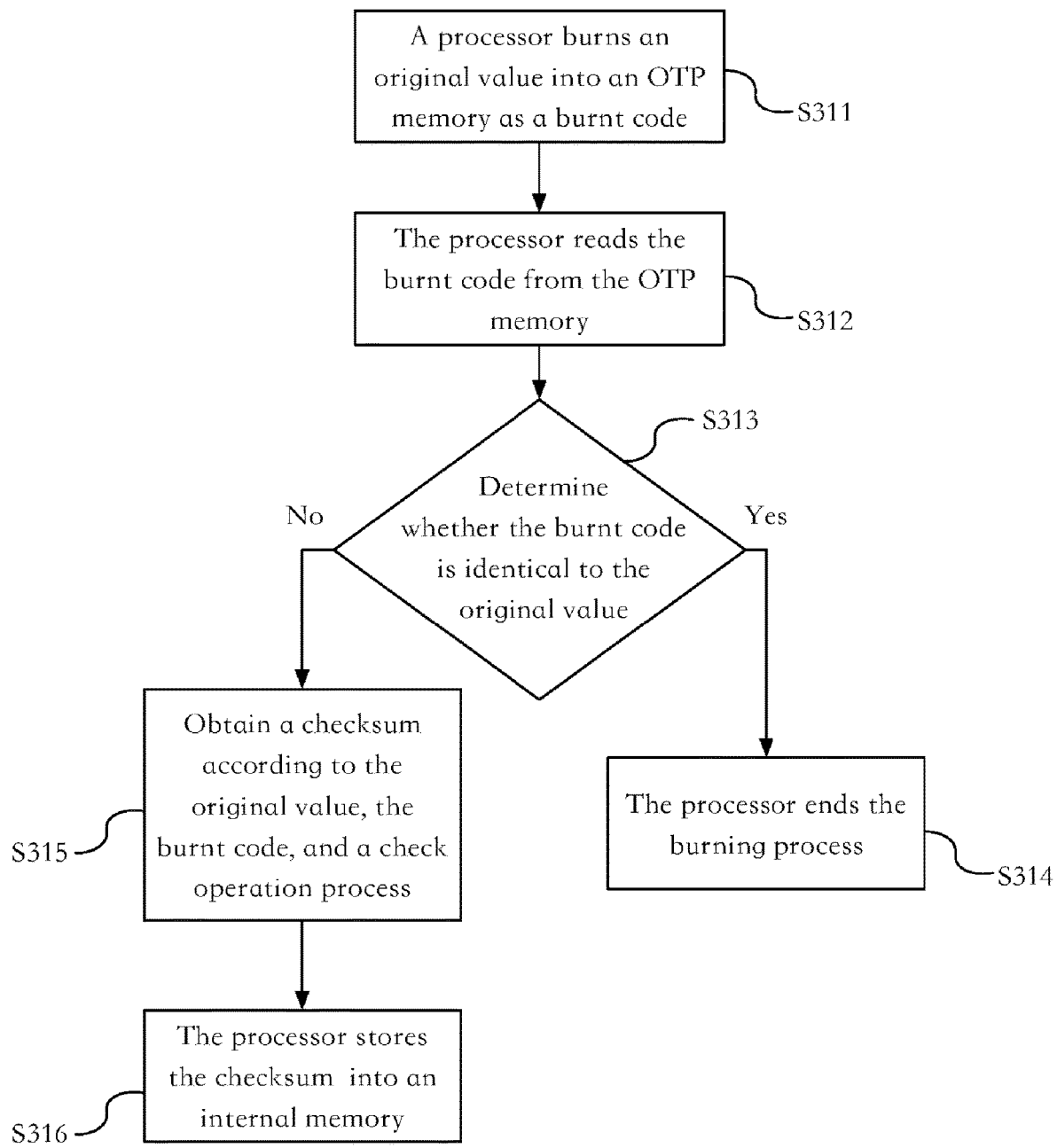
FIG. 3A is a schematic flowchart of writing and checking the original value according to the present disclosure.

In order to further describe the operation process of this embodiment, referring to the schematic flowchart of writing and check of the original value of FIG. 3A. The writing and check process in some embodiments includes the following steps.

Step S311: an original value is burnt, by a processor, into an OTP memory as a burnt code.

Step S312: the burnt code is read, by the processor, from the OTP memory.

Step S313: whether the burnt code is identical to the original value is determined.

Step S314: When the original value is identical to the burnt code, the burning process is completed by the processor.

Step S315: a checksum is obtained according to the original value, the burnt code, and a check operation process when the original value is not identical to the burnt code.

Step S316: the checksum is stored, by the processor, into an internal memory.

After the electronic device 100 first receives a writing request from the external apparatus 200, the processor 130 obtains the original value 210 according to the writing request. The processor 130 burns the original value 210 into the OTP memory 110, so that the OTP memory 110 stores the burnt code 111. Upon completion of the storage of the burnt code 111, the processor 130 reads the burnt code 111 from the OTP memory 110. The processor 130 determines whether the burnt code 111 is identical to the original value 210.

If the content of the burnt code 111 is identical to the original value 210, the processor 130 ends the current burning procedure. If the content of the burnt code 111 is not identical to the original value 210, the processor 130 generates a checksum 121 according to the original value 210 and the burnt code 111.

Figure 3B:
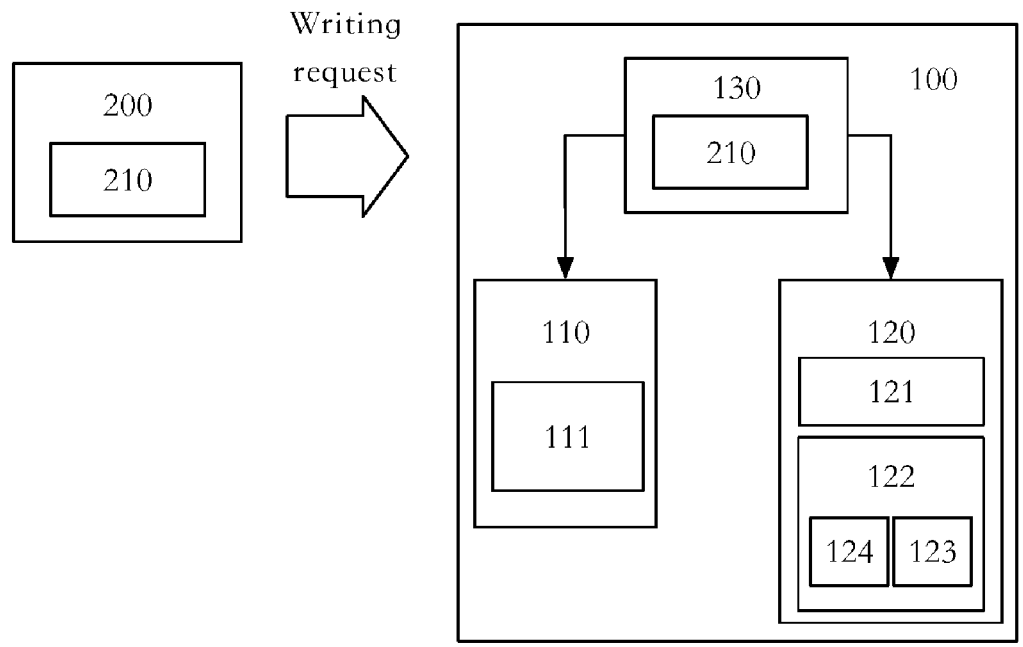
FIG. 3B a schematic diagram of a system architecture according to another embodiment of the present disclosure.

In some embodiments, the electronic device 100 is adapted to execute a bit operation process 122. The bit operation process 122 can be stored in the internal memory 120 or other storage apparatuses. The bit operation process 122 is collectively referred to as a check operation process 123 and a recovery operation process 124, as shown in FIG. 3B. In some embodiments, the check operation process 123 and the recovery operation process 124 are invertible operation processes. The invertible operation is to be described later.

Figure 3C:
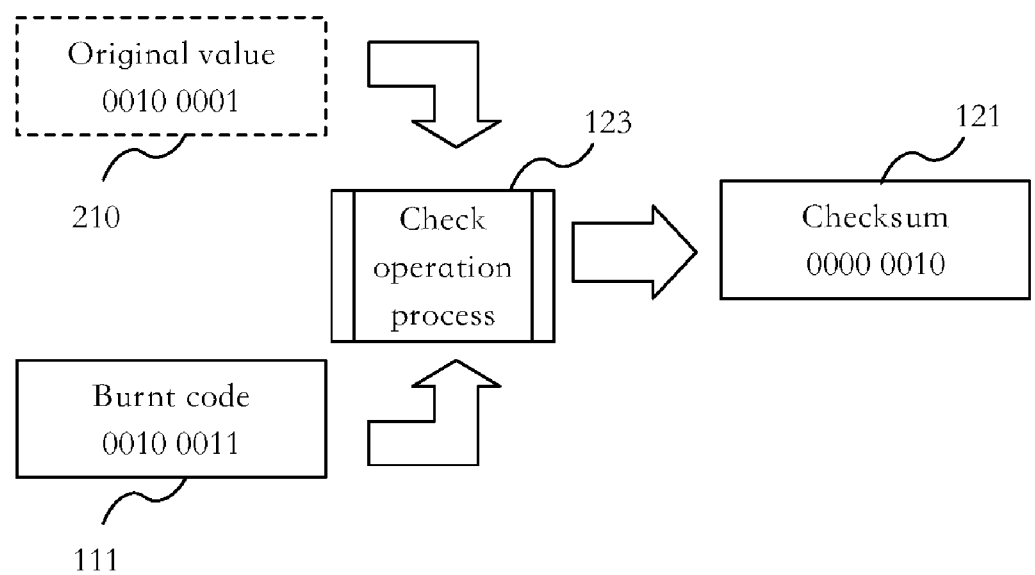
FIG. 3C is a schematic diagram of generating the original value, the burnt code, and the checksum according to the present disclosure.

In some embodiments, the bit operation process 122 may include the check operation process 123 corresponding to an exclusive-OR (XOR for short) operation. The processor 130 may execute the check operation process 123 according to the original value 210 and the burnt code 111 in order to obtain the checksum 121. The XOR operation and the values in FIG. 2B are given by way of example. The original value 210 in FIG. 2B is "0010 0001", and the burnt code 111 is "0010 0011". The processor 130 can obtain the checksum 121 "0000 0010" after performing the check operation process 123 on the original value 210 and the burnt code 111, as shown in FIG. 3C. The processor 130 writes the checksum 121 into the internal memory 120.

In some embodiments, the check operation process 123 may be selected from at least one of the group consisting of the XOR operation, an OR operation, an AND operation, an addition operation, and a subtraction operation, but the present disclosure is not limited thereto.

In some embodiments, the checksum may be additionally stored in another OTP memory, an electrical fuse element (efuse), or a secure storage, but the present disclosure is not limited thereto.

Figure 4:
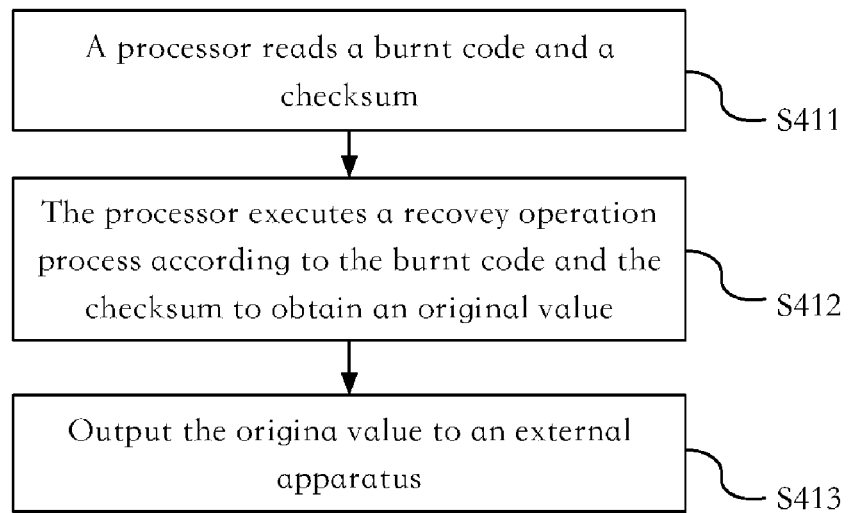
FIG. 4 is a schematic flowchart of reading the burnt code and correcting the checksum according to the present disclosure.

With respect to the above writing process of the original value 210, the following is a read check process performed by the electronic device 100 according to the original value 210. In this embodiment, for a hardware architecture of the electronic device 100, reference may be made to FIG. 1. However, the process of reading and checking the original value 210 of the electronic device 100 may be shown in FIG. 4. The reading and checking process includes the following steps.

Step S411: a burnt code and a checksum is read by a processor.

Step S412: a recovery operation process is executed, by the processor, according to the burnt code and the checksum to obtain an original value.

Step S413: the original value is outputted, by the processor, to an external apparatus.

First, the processor 130 receives a request from the external apparatus 200 to read the original value 210. For example, the external apparatus 200 is to obtain firmware version information (e.g., a value corresponding to the written original value 210) of the electronic device 100. The processor 130 directly reads the OTP memory 110 and the internal memory 120 to obtain the burnt code 111 and the checksum 121. The processor 130 executes the recovery operation process 124 according to the burnt code 111 and the checksum 121.

The invertible operation means that an output result is obtained through the bit operation process 122 performed on input data, and input data may also be obtained through the bit operation process 122 performed on an output result. Operation combinations of the check operation process 123 and the recovery operation process 124 may not necessarily be the same, or may differ depending on differences in adopted bit operation sums. Based on the above, the check operation process 123 corresponds to an exclusive-OR (XOR) operation, and the recovery operation process 124 also corresponds to the XOR operation like the check operation process 123. The processor 130 may obtain the original value 210 according to the calculation of the recovery operation process 124 and send the original value 210 to the external apparatus 200.

The burnt code 111 and the checksum 121 in FIG. 3C are given by way of example. In the foregoing, the processor 130 obtains the checksum 121 "0000 0010" through calculation, and the internal memory 120 records the burnt code 111 "0010 0011". The processor 130 performs the recovery operation process 124 on the checksum 121 and the burnt code 111, and the recovery operation process 124 performs an XOR operation. Finally, the processor 130 obtains an output result "0010 0001" of the recovery operation process 124. The processor 130 outputs the calculated original value 210 (i.e., the output result "0010 0001" of the recovery operation process 124) to the external apparatus 200.

Figure 5:
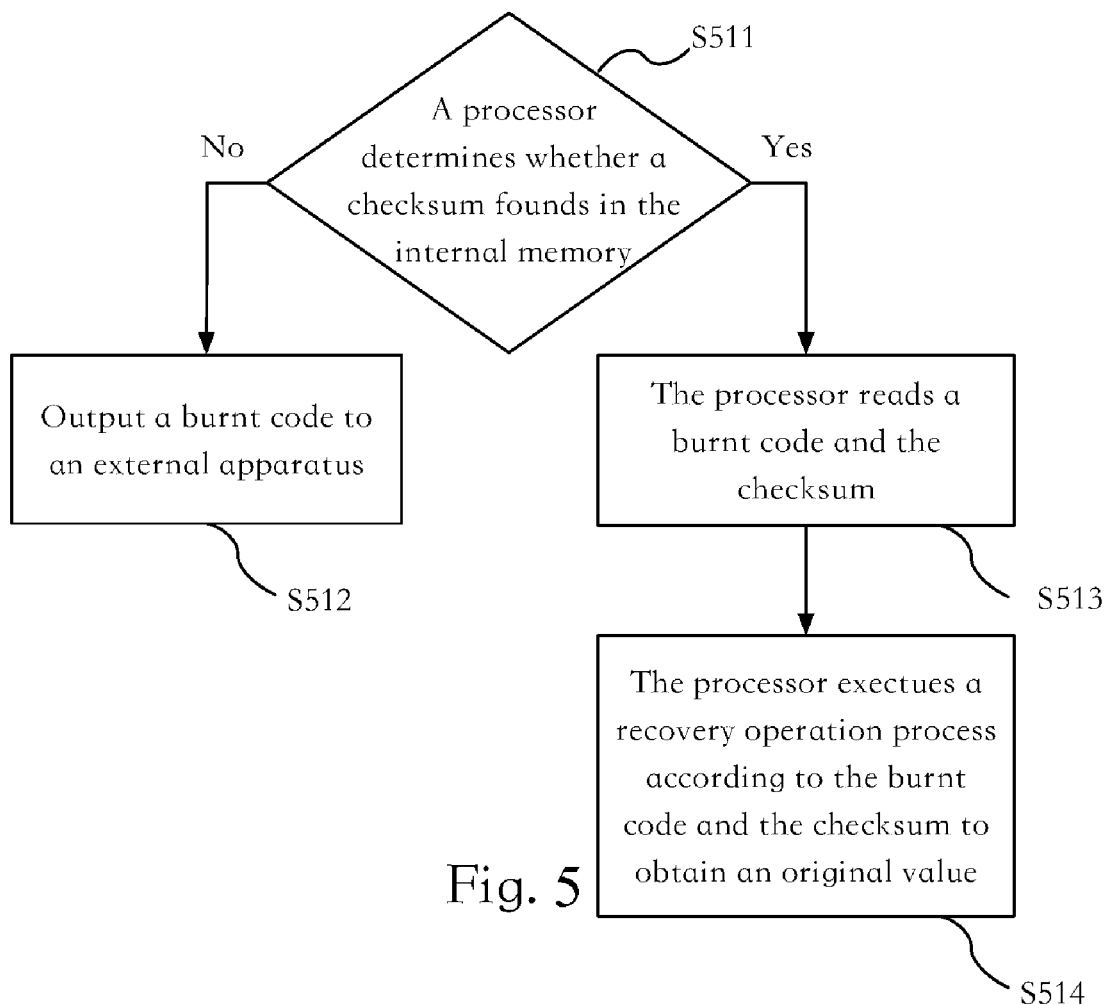
FIG. 5 is a schematic flowchart of reading the burnt code and correcting the checksum according to some embodiments of the present disclosure.

In some embodiments, the processor 130 may further determine whether a checksum 121 is found in the internal memory 120, as shown in FIG. 5. In this embodiment, the reading and checking process includes the following steps.

Step S511: whether a checksum is found, by a processor, in an internal memory.

Step S512: If the checksum is not found in the internal memory, a burnt code is outputted to an external apparatus.

Step S513: If the checksum is found in the internal memory, the burnt code and the checksum are read by the processor.

Step S514: a recovery operation process is executed, by the processor, according to the burnt code and the checksum to obtain an original value.

In this embodiment, when the electronic device 100 receives a reading request for the original value 210 of the external apparatus 200, the processor 130 first reads the internal memory 120 and determines whether the internal memory 120 stores the checksum 121. If there is no checksum 121 in the internal memory 120, the processor 130 directly reads the burnt code 111 of the OTP memory 110 and outputs the burnt code 111 to the external apparatus 200. If the checksum 121 is found in the internal memory 120, the processor 130 reads the checksum 121 from the internal memory 120.

Furthermore, the processor 130 also reads the burnt code 111 from the OTP memory 110. The processor 130 may execute the recovery operation process 124 according to the burnt code 111 and the checksum 121 to obtain the original value 210. The check operation process 123 and the recovery operation process 124 are mutually invertible operations. The electronic device 100 transmits the original value 210 to the external apparatus 200.

Based on the above, the electronic device 100 having an OTP memory and the method for writing and reading can check the erroneous burnt code 111 existing in the OTP memory 110, especially in a case that a bit change occurs when the original value 210 is written into the OTP memory 110. In addition, when the external apparatus 200 is to read the electronic device 100 and the original value 210, the electronic device 100 can obtain the correct original value 210 through the check method. The processor 130 can achieve the purpose of checking only through the bit operation during writing and reading of the original value 210. However, compared with other check means, an arrangement of hardware or software for bit operations is more economical and efficient even if being implemented in all or most of the programmable memory in mass production.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. An electronic device having a one-time-programmable (OTP) memory, comprising:
   an OTP memory;
   an internal memory; and
   a processor configured to write an original value into the OTP memory as a burnt code and read the burnt code from the OTP memory, wherein when the burnt code is not identical to the original value, the processor obtains a checksum according to the original value and the burnt code, and stores the checksum into the internal memory.

2. The electronic device having an OTP memory according to claim 1, wherein the processor executes a check operation process according to the original value and the burnt code to obtain the checksum.

3. The electronic device having an OTP memory according to claim 2, wherein the check operation process is selected from at least one of the group consisting of an exclusive-OR operation, an OR operation, an AND operation, an addition operation, and a subtraction operation.

4. The electronic device having an OTP memory according to claim 1, wherein the processor reads the burnt code from the OTP memory according to a reading request and obtains the original value according to the burnt code and a recovery operation process, and the recovery operation process is an invertible operation process of the check operation process.

5. The electronic device having an OTP memory according to claim 4, wherein the recovery operation process and the check operation process are both based on a exclusive-OR operation.

6. A method for writing an OTP memory, comprising:
   writing an original value into an OTP memory as a burnt code;
   reading the burnt code from the OTP memory;
   when the original value is not identical to the burnt code, obtaining a checksum according to the original value, the burnt code, and a check operation process; and
   storing the checksum.

7. The method for writing an OTP memory according to claim 6, wherein when the original value is identical to the burnt code, the writing method is completed.

8. The method for writing an OTP memory according to claim 6, wherein the check operation process is selected from at least one of the group consisting of an exclusive-OR operation, an OR operation, an AND operation, an addition operation, and a subtraction operation.

9. A method for reading an OTP memory written according to claim 6, comprising:
   determining whether the checksum is found;
   if the checksum is found, reading the burnt code and the checksum; and
   executing a recovery operation process according to the burnt code and the checksum to obtain the original value, wherein the recovery operation process is an invertible operation process of the check operation process.

10. The reading method according to claim 9, further comprising: if the checksum is not found, outputting the burnt code.

* * * * *